US011131293B2

(12) United States Patent
Lieckfeldt

(10) Patent No.: US 11,131,293 B2
(45) Date of Patent: Sep. 28, 2021

(54) ENCLOSURE FOR A NACELLE OF A WIND TURBINE

(71) Applicant: SENVION GmbH, Hamburg (DE)

(72) Inventor: Nils Lieckfeldt, Melsdorf (DE)

(73) Assignee: Senvion GmbH, Hamburg (DE)

( * ) Notice: Subject to any disclaimer, the term of this patent is extended or adjusted under 35 U.S.C. 154(b) by 138 days.

(21) Appl. No.: 15/970,330

(22) Filed: May 3, 2018

(65) Prior Publication Data

US 2018/0320665 A1   Nov. 8, 2018

(30) Foreign Application Priority Data

May 4, 2017   (DE) .................... 10 2017 004 291.8

(51) Int. Cl.
| F03D 13/10 | (2016.01) |
| F03D 80/30 | (2016.01) |
| F03D 80/80 | (2016.01) |
| F03D 1/00  | (2006.01) |
| F03D 80/70 | (2016.01) |

(52) U.S. Cl.
CPC ............... F03D 13/10 (2016.05); F03D 1/00 (2013.01); F03D 80/30 (2016.05); F03D 80/70 (2016.05); F03D 80/82 (2016.05); F03D 80/88 (2016.05); F05B 2240/14 (2013.01)

(58) Field of Classification Search
CPC .......... F03D 13/10; F03D 80/30; F03D 80/70; F03D 80/80; F03D 80/82; F03D 80/88; F03D 1/00; F05B 2240/14; F05B 2240/912; Y02E 10/726; E04H 12/003; E04H 12/20;

(Continued)

(56) References Cited

U.S. PATENT DOCUMENTS 3,606,704 A * 9/1971 Denton ................. E04F 15/024
52/167.8
9,677,543 B2 * 6/2017 Kamibayashi .......... F03D 13/10
(Continued)

FOREIGN PATENT DOCUMENTS

| CN | 101078390 A | 11/2007 |
| CN | 201425004 Y | 3/2010 |

(Continued)

OTHER PUBLICATIONS

European Search Report dated Sep. 19, 2018 for European Patent Application No. 18170489.1.

(Continued)

*Primary Examiner* — Brian P Wolcott
*Assistant Examiner* — Justin A Pruitt
(74) *Attorney, Agent, or Firm* — Alix, Yale & Ristas, LLP

(57) ABSTRACT

An enclosure for a nacelle of a wind turbine is connected to a substructure in a manner that allows the enclosure to move relative to the substructure. An imaginary straight line extends over the panel and is aligned with an edge of the panel. The imaginary straight line defines a first sub-portion of the panel, said first sub-portion comprising the edge. The first sub-portion butts against the substructure. The first sub-portion is retained against the substructure by a tension element acting in a direction of tension. The first sub-portion can be displaced relative to the substructure in a direction which intersects the direction of tension. The invention facilitates the operation of assembling the enclosure.

15 Claims, 6 Drawing Sheets

(58) Field of Classification Search
CPC .......... B60N 2/045; B60N 2/507; A47G 1/16; B65H 75/4431; H02G 11/02
USPC ...................................................... 416/146 R
See application file for complete search history.

(56) References Cited

U.S. PATENT DOCUMENTS

| | | | |
|---|---|---|---|
| 10,189,340 B2* | 1/2019 | Schmeichel | B60J 7/141 |
| 2010/0090472 A1* | 4/2010 | Berthelsen | F03D 80/30 |
| | | | 290/55 |
| 2011/0076140 A1* | 3/2011 | Elsenheimer | F03D 80/00 |
| | | | 415/200 |
| 2011/0278852 A1 | 11/2011 | Hjort | |
| 2012/0045321 A1 | 2/2012 | Andersen et al. | |
| 2012/0134841 A1 | 5/2012 | Madge et al. | |
| 2013/0195653 A1* | 8/2013 | Hayashi | F03D 80/00 |
| | | | 416/1 |
| 2020/0158083 A1* | 5/2020 | Nitsche | F03D 13/20 |

FOREIGN PATENT DOCUMENTS

| | | |
|---|---|---|
| CN | 102235321 A | 11/2011 |
| CN | 102695876 A | 9/2012 |
| CN | 102840105 A | 12/2012 |
| CN | 103270297 A | 8/2013 |
| CN | 105822507 A | 8/2016 |
| CN | 106164485 A | 11/2016 |
| CN | 205779506 U | 12/2016 |
| DE | 102006001931 A1 | 7/2007 |
| DE | 102008027498 A1 | 12/2009 |
| DE | 102010002828 A1 | 9/2011 |
| DE | 102013002528 A1 | 8/2014 |
| DE | 102017107912 A1 * | 10/2018 |
| EP | 2428676 A1 | 3/2012 |
| EP | 2636898 A1 | 9/2013 |
| EP | 3002456 A1 | 4/2016 |
| WO | 2015155131 A1 | 10/2015 |

OTHER PUBLICATIONS

German Search Report and Written Opinion dated Mar. 12, 2018 (DE10 2017 004 291.8).
Chinese Search Report for Application No. 201810414636.9 filed May 3, 2018, dated Jun. 6, 2019, 8 pgs.

* cited by examiner

ENCLOSURE FOR A NACELLE OF A WIND TURBINE

BACKGROUND

The invention relates to an enclosure for a nacelle of a wind turbine. The enclosure comprises a panel which is connected to a substructure.

In a wind turbine, it is usually the case that a nacelle is mounted in a rotatable manner on a tower. The nacelle bears a rotor, which is made to rotate by the wind and drives a generator in order to generate electrical energy. Rotation of the nacelle relative to the tower can orient the rotor in the wind direction.

The nacelle contains a plurality of components, for example a rotor shaft, transmission, generator, converter, controllers, etc. The components arranged in the nacelle are protected against environmental influences by an enclosure.

The enclosure can be made up of a plurality of panels, EP 2 636 898 A1 and WO 2015/155131 A1. The panels can be connected to one another, or to the substructure, along their edges, and together form an essentially closed casing around the nacelle. To provide for good connection in relation to the substructure, and in relation to adjacent panels, the panels have to be manufactured with a sufficient level of precision. The large surface areas of the panels and the manufacturing tolerances in steel construction and GRP construction mean that this is not a wholly straightforward task, for which reason an amount of manual follow-up work is often necessary.

SUMMARY OF THE INVENTION

The invention is based on the object of presenting an enclosure which is intended for a nacelle of a wind turbine and can be assembled with reduced outlay. Proceeding from the aforementioned prior art, the object is achieved by the features of claim 1. Advantageous embodiments are specified in the dependent claims.

In the case of the panel according to the invention, an imaginary straight line extends over the panel and is aligned parallel to an edge of the panel. The imaginary straight line defines a first sub-portion of the panel, said first sub-portion comprising the edge. The first sub-portion butts against the substructure. The first sub-portion is retained against the substructure by a tension element acting in a direction of tension. The first sub-portion can be displaced relative to the substructure in a direction which intersects the direction of tension.

Since the first sub-portion is retained against the substructure merely by way of a tension element, there is no need for the first sub-portion of the panel and the substructure to be positioned relative to one another with a high level of precision. Rather, the first sub-portion can be displaced relative to the substructure until the fastening means arranged in a second sub-portion of the panel can be made to engage to good effect. This provides for straightforward assembly of the panel, even when neither the panel nor the substructure has been manufactured with any great level of precision.

If the panel is approximately rectangular, the imaginary straight line can intersect two opposite edges of the rectangle. The imaginary straight line is then aligned with a third edge, to which the imaginary straight line can extend essentially parallel. The first sub-portion of the panel, said first sub-portion being defined by the imaginary straight line, can make up at least 30%, preferably at least 50%, and further preferably at least 80% of the surface area of the panel.

In the second sub-portion of the panel, said second sub-portion being arranged on the other side of the imaginary straight line, the panel can be connected to the substructure via fixed bearings. It is not possible for the panel to be displaced relative to the substructure in the region of a fixed bearing. The fastening can comprise one or more bores which are formed in the panel and are in alignment with corresponding bores in the substructure. The connection can be established, for example, by threaded bolts which extend through the aligned bores. The bores in the panel and/or the bores in the substructure can have a greater diameter, in one or more directions, than the bolts guided through the same, and therefore the second sub-portion of the panel can be adjusted relative to the substructure. It is only the fastening elements, which are arranged in the second sub-portion, which needs to be taken into account for such an adjustment. The first sub-portion of the panel can be displaced freely, relative to the substructure, to the extent necessary for the adjustment.

For the rigid fastening on the substructure, the panel can comprise a plurality of bores which extend along an edge of the panel. This edge of the second sub-portion can be arranged opposite that edge of the first sub-portion with which the imaginary straight line is aligned.

The tension element can extend between the first sub-portion of the panel and an anchoring point of the substructure. So that a displacement of the first sub-portion relative to the substructure does not have too pronounced an effect on the direction of tension of the tension element, it is advantageous if the tension element has a length of at least 10 cm, preferably at least 20 cm. The tension element can be designed in the form of a pull rod, of which the length can be adjusted for example via a thread. It is also possible to use a pull cable or a tension spring. The enclosure can comprise a plurality of tension elements, for example two tension elements, three tension elements or four tension elements, which extend between the first sub-portion and the substructure.

The panel can be reinforced in the region in which the tension element acts on the panel. For example, it is possible for a reinforcing profile to be arranged on an inner side of the panel on which the tension element acts. The reinforcing profile can extend over the length of the panel. In the region in which there is a rigid connection in relation to the substructure, the panel, for the purpose of further reinforcement, can have an upright profile which is angled in relation to the surface of the panel. The upright profile can be designed, for example, in the form of a flange, through which are guided screws which fasten the panel on the substructure.

One edge of the panel can overlap with a further panel. In particular it is possible for that edge in the first sub-portion of the panel with which the imaginary straight line is aligned to overlap with another panel. If the first sub-portion butts against the other panel and the other panel, for its part, is borne by the substructure, then the first sub-portion, for the purposes of the invention, butts against the substructure. In addition, or as an alternative, it is likewise possible for an edge in the second sub-portion of the panel to overlap with a further panel.

The substructure can be borne by a machinery carrier of the nacelle. A machinery carrier denotes a means on which, for example, the rotor shaft, the transmission or the generator is mounted. The substructure can comprise struts. It is possible for fastening points, on which the panel is fastened or on which the panel rests, to be formed on the struts. The struts can extend essentially parallel to the panel.

The panel can be a side panel, that is to say a panel which forms a side wall of the enclosure. The first sub-portion can form a lower portion of the side panel. The second sub-portion can form an upper portion of the side panel. The imaginary straight line can extend essentially horizontally and parallel to a longitudinal axis of the nacelle.

A roof panel can adjoin the side panel in the upward direction. The roof panel can comprise a side portion which overlaps with the upper portion of the side panel. The overlap can be of rain-tight design, and it is therefore not possible for rainwater, which comes from the roof panel to penetrate into the interior of the enclosure at the transition between the roof panel and the side panel. A gap can be formed between the side portion of the roof panel and the upper portion of the side panel, and it is therefore possible for the roof panel and the side panel to move relative to one another in this region.

It is possible for the roof panel to extend over the entire width of the enclosure and, at its other end, to adjoin a side panel arranged on the opposite side.

The roof panel can be fastened on the substructure via one or more bearings. A row of bearings formed by the bearings of the roof panel can extend essentially parallel to a row of bearings of the side panel. The bearings of the roof panel can comprise fixed bearings and plain bearings. If the roof panel comprises, for example, three bearings adjacent to a side panel, then it is possible for two bearings to be designed in the form of fixed bearing and for one bearing to be designed in the form of a plain bearing. The plain bearing can be the foremost bearing, that is to say the bearing arranged closest to the rotor.

The roof panel can be made up of a plurality of panel parts. One roof panel can comprise, for example, two, three or four panel parts. The panel parts can extend over the entire width of the enclosure. The panel parts can be arranged one behind the other in the longitudinal direction. A flange can be formed between two adjacent panel parts. Bores can be formed in the flange, and this allows the panel parts to be connected for example by screws. One or more bearings by which the roof panel is mounted in relation to the substructure can be arranged in a transition region between a first panel part and a second panel part. The bearings can be configured in the form of supports.

At its rear end, which is directed away from the rotor, the roof panel can be retained by a tension device, which exerts tension in the forward direction. The tension element can be designed, at the same time, in the form of a receptor of a lightning rod. The lightning rod of the wind turbine can extend from a receptor, via a path within the nacelle and one within the tower, to a grounding point.

A roof panel can be equipped with technical devices, for example measuring units or sensors, which project upward beyond the roof panel. In the case of a roof panel being made up of a plurality of panel parts, these technical devices can all be accommodated in the same panel part. One upwardly projecting device can be designed in the form of a receptor of the lightning rod.

A floor panel can adjoin the side panel in the downward direction. The first sub-portion of the side panel can overlap with the floor panel. The overlap can be of rain-tight design, and it is therefore not possible for water which runs down the side panel to penetrate into the interior of the enclosure at the transition to the floor panel. The first sub-portion of the side panel can be mounted in a displaceable manner relative to the floor panel. When the first sub-portion of the side panel is drawn inward via a tension element, an outer surface of the floor panel can form an abutment for the tension.

The floor panel can be connected to the substructure via fixed bearings. The fixed bearings can be arranged in a row which extends parallel to the lower end of the side panel. It is possible for the floor panel to extend over the entire width of the enclosure and to have its other end adjoin an adjacent side panel on the opposite side of the enclosure. A roof panel, two side panels and a floor panel can form a casing which extends around the interior of the nacelle.

The enclosure can comprise a first side panel and a second side panel, which are arranged one behind the other in the longitudinal direction. The first side panel and the second side panel can be displaced relative to one another in the longitudinal direction. The first side panel can be connected to a first portion of the substructure, and the second side panel can be connected to a second portion of the substructure. The first side panel and the second side panel can be displaced relative to one another, the substructure being subjected to elastic deformation in the process. If, during operation, the nacelle deforms under bending or torsion, then longitudinal displacements of the side panels relative to one another are permitted and this counteracts any deformation imposed on the panels and the accompanying reactions of the bearings.

The first side panel can overlap with the second side panel in the longitudinal direction. In the overlap, preferably the front side panel is arranged on the outside and the rear side panel is arranged on the inside. A rear termination of the front side panel can be inclined relative to the vertical. An upper portion of the front side panel can extend further in a rearward direction than a lower portion of the front side panel.

The enclosure can comprise a first roof panel and a second roof panel. The first roof panel can be connected to a first portion of the substructure, and the second roof panel can be connected to a second portion of the substructure. The first roof panel and the second roof panel can be displaced relative to one another, the substructure being subjected to elastic deformation in the process. During operation, torsion of the nacelle can thus be absorbed without any transmission of forces between the roof panels. Such an enclosure is inventive in its own right, irrespective of how the connection between the panels and the substructure is established.

The two portions of the substructure can be connected to the machinery carrier, and to this extent there is therefore a mechanical connection between the two portions of the substructure. In order for the two portions of the substructure to be subjected to elastic deformation independently of one another, it is advantageous if, starting from the machinery carrier, the substructure forms a long lever arm in which there is no mechanical coupling between the portions of the substructure. The lever arm can extend for example over at least 10%, preferably at least 20%, and further preferably at least 50% of the height of the nacelle in the relevant region.

The first roof panel and the second roof panel can be arranged one behind the other in the longitudinal direction. The first roof panel and the second roof panel can be displaced relative to one another in the longitudinal direction.

The first roof panel can be an element of a front part of the housing, said front part being directed toward the rotor, and the second roof panel can be an element of a rear part of the housing. The front part and/or the rear part can comprise one or more side panels. In particular it is possible for the front part and/or the rear part to extend circumferentially around the interior of the nacelle and each to comprise a roof panel, two side panels and a floor panel.

An intermediate panel can be arranged at the transition between the roof panel of the front part and the roof panel of the rear part. The intermediate panel can have a smaller height than the roof panel of the front part and the roof panel of the rear part. The intermediate panel can have a water channel, and this means that water which drips from one of the roof panels is directed away. The rain channel can extend in the transverse direction, and therefore the water flows to the side. The roof panel of the front part and/or the roof panel of the rear part can overlap with the intermediate panel in the longitudinal direction. The roof panel of the rear part can have a lower height than the roof panel of the front part.

The invention also relates to a nacelle equipped with such an enclosure. The invention further relates to a wind turbine having a tower on which such a nacelle is mounted in a rotatable manner. The nacelle bears a rotor, which drives a generator via a rotor shaft.

BRIEF DESCRIPTION OF THE DRAWINGS

Advantageous embodiments of the invention will be described by way of example below with reference to the accompanying drawings, in which.

DETAILED DESCRIPTION

Figure 1:
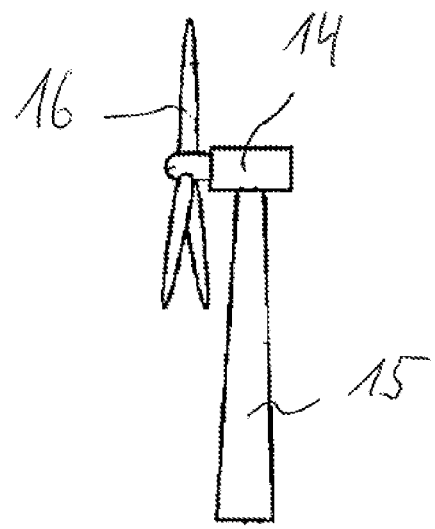
FIG. 1 shows a schematic illustration of a wind turbine according to the invention.

In a wind turbine according to the invention, which is shown in FIG. 1, a nacelle 14 is mounted in a rotatable manner on a tower 15. A rotor 16 is made to rotate by the wind and drives a generator via a transmission. The generator generates electric current, which is fed into an energy distribution network.

Figure 2:
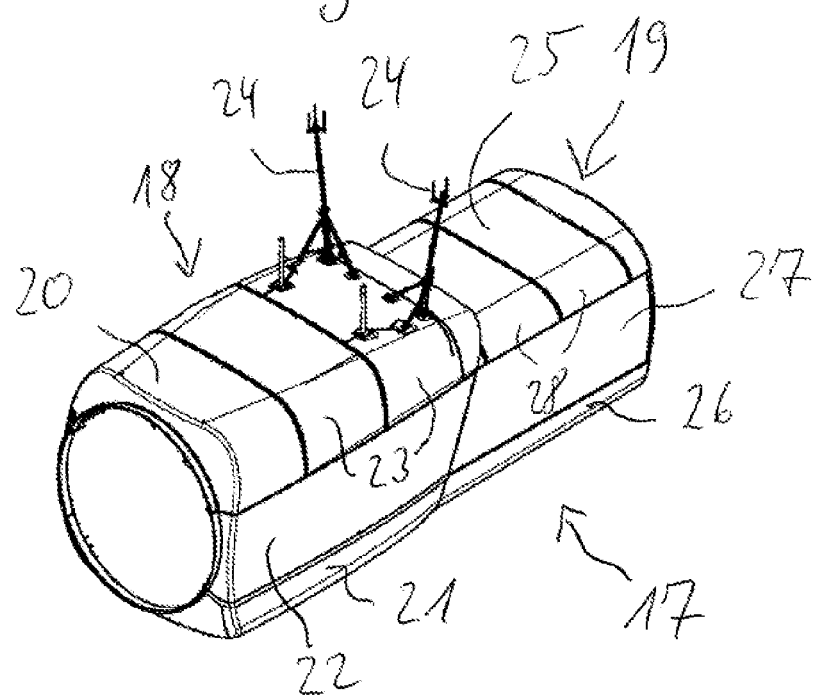
FIG. 2 shows a perspective illustration of an enclosure according to the invention.

The nacelle 14 has an enclosure 17 which is shown in FIG. 2, said enclosure surrounding the interior of the nacelle 14 and providing protection against weathering influences for the components arranged therein. The enclosure 17 is made up of a front part 18 and a rear part 19. The front part 18 comprises a roof panel 20, a floor panel 21 and two side panels 22, of which only one can be seen in FIG. 2. The roof panel 20 is made up of four panel parts 23 arranged one behind the other in the longitudinal direction. A first panel part 23 is arranged at the front and is adjacent to an opening of the nacelle 14, which surrounds the rotor hub. A second and a third panel part 23 adjoin in a longitudinal direction. The rear termination of the roof panel 20 is formed by a fourth panel part 23. The four panel parts 23 are provided with flanges, along the joints shown in FIG. 2, and screwed to one another, and therefore the roof panel 20 can be positioned as a single unit on the nacelle 14.

The third panel 23 is provided with a number of technical devices which project upward beyond the roof panel 20. Two upwardly projecting masts form receptors 24 of a lightning rod. A lighting strike passing into the receptors 24 is conducted to ground via a conductor path in the nacelle and in the tower.

The rear part 19 of the enclosure comprises a roof panel 25, a floor panel 26 and two side panels 27, of which only one can be seen in FIG. 2. The roof panel 25 is made up of three panel parts 28, which are arranged one behind the other and are screwed to one another along the joints shown in FIG. 2.

Figure 3:
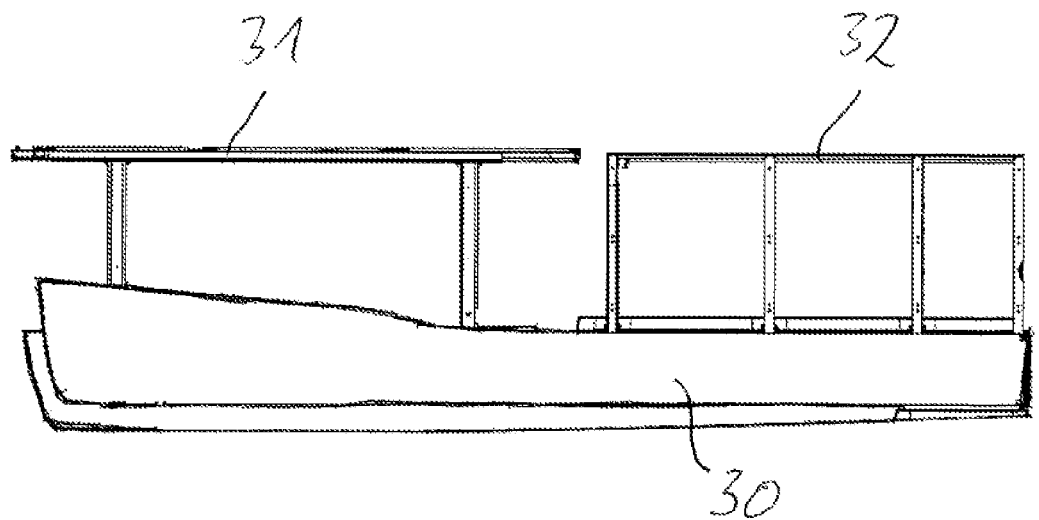
FIG. 3 shows a machinery carrier and a substructure of a nacelle according to the invention.

According to FIG. 3, the nacelle 14 contains a machinery carrier 30, which forms a load-bearing structure for the components arranged in the nacelle 14. These components include the rotor shaft, the transmission and the generator. The machinery carrier 30 also forms a load-bearing structure for a front portion 31 of a substructure and a rear portion 32 of a substructure. The portions 31, 32 of the substructure are connected to one another via the machinery carrier 30, but are otherwise uncoupled from one another in mechanical terms.

The front portion 31 of the substructure bears the front part 18 of the enclosure 17. The rear portion 32 of the substructure bears the rear part 19 of the enclosure 17. The front part 18 and the rear part 19 of the enclosure 17, rather than being connected to one another, can be displaced relative to one another in the longitudinal direction. The front part 18 here surrounds the rear part 19 from the outside. Since the front part is oriented in the wind direction, there is no gap formed between the front part 18 and the rear part 19 into which the wind can penetrate directly.

Figure 4:
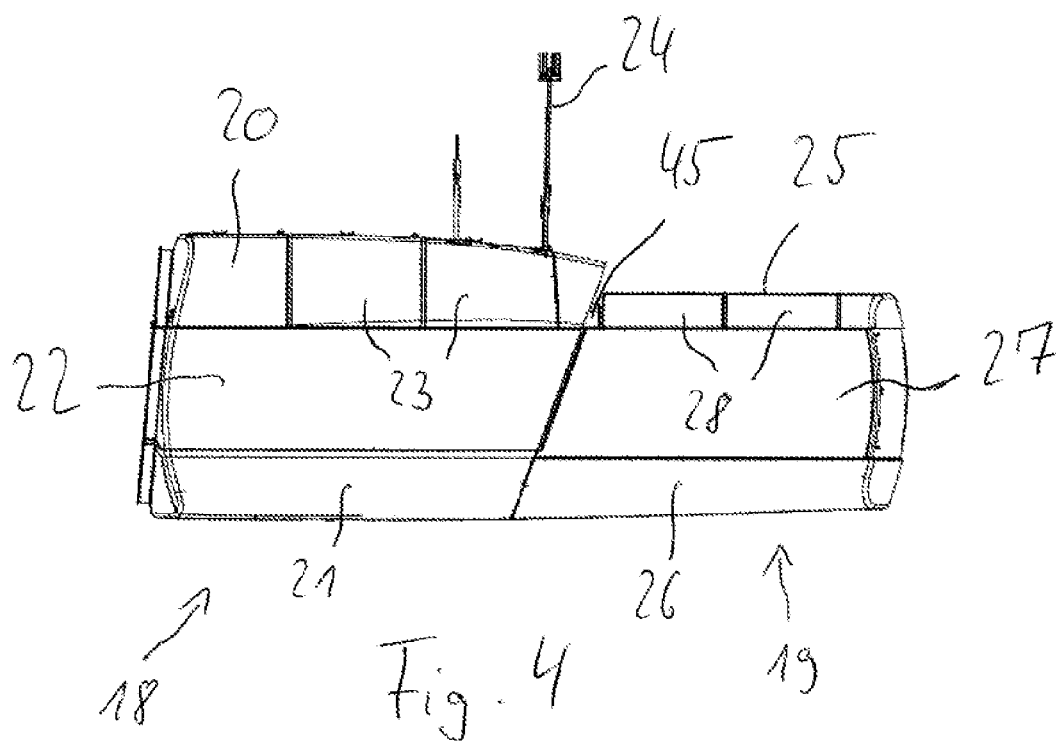
FIG. 4 shows a side view of the enclosure according to FIG. 2.
Figure 8:
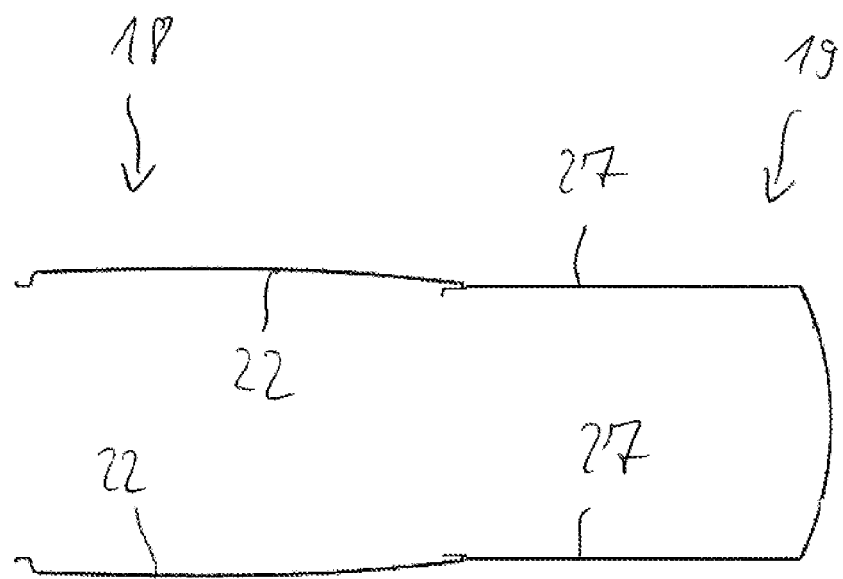
FIG. 8 shows a horizontal longitudinal section through an enclosure according to the invention.
Figure 9:
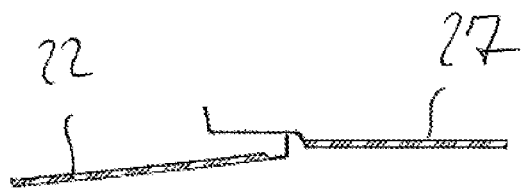
FIG. 9 shows an enlarged illustration of a detail from FIG. 8.
Figure 10:
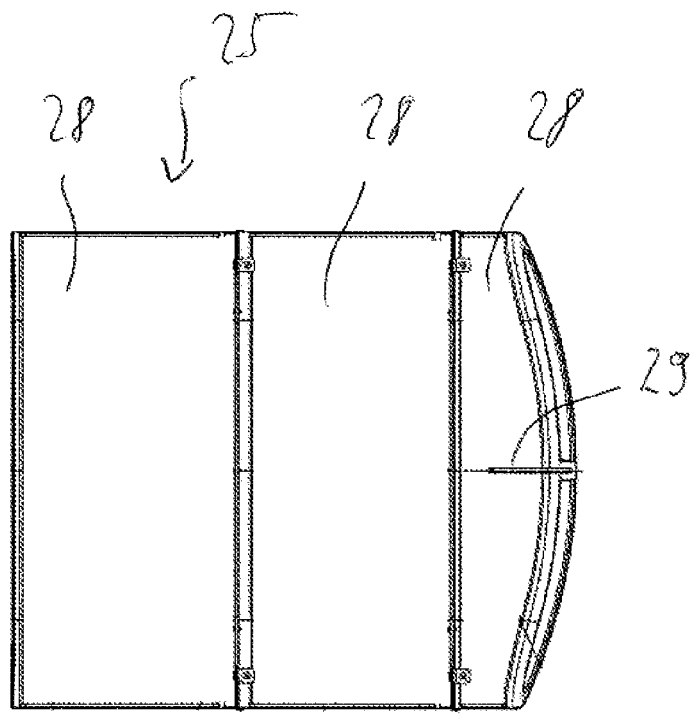
FIG. 10 shows a view from above of a roof panel according to the invention.
Figure 11:
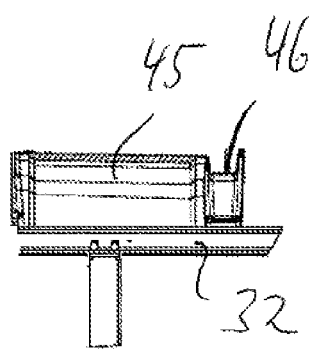
FIG. 11 shows a side view of an intermediate panel according to the invention.

According to FIG. 8, the side panel 22 of the front panel 18 overlaps with the side panel 27 of the rear part 19 in the longitudinal direction. The overlap, according to FIG. 4, is inclined relative to the vertical and, according to FIG. 9, is configured such that rainwater is directed downward and does not penetrate into the interior of the nacelle 14.

Figure 5:
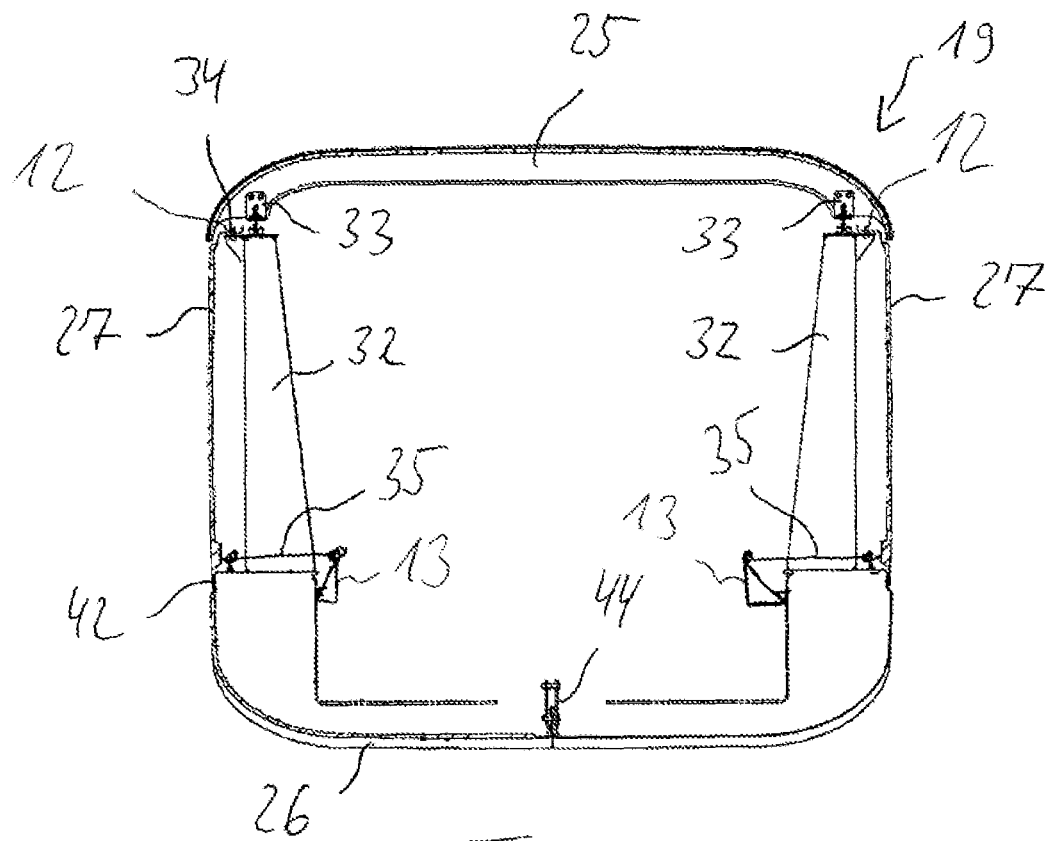
FIG. 5 shows a cross section through the rear part of an enclosure according to the invention.

FIG. 5 shows a cross section through the rear part 19 of the enclosure 17. The rear portion of the substructure 32 supports the roof panel 25 via angle plates and thus forms fixed bearings 33 for the roof panel 25. The roof panel 25 is supported on the rear portion of the substructure 32 by fixed bearings 33 in the region of the joints between the panel parts 28. The front end of the roof panel 25, in addition, is supported in relation to the rear portion of the substructure 32 by a plain bearing which can be displaced in the longitudinal direction and transverse direction. The rear end of the roof panel 25 is retained on the rear portion of the substructure 32 via a tension device 29 which acts in the forward direction. An outer end of the tension device 29, at the same time, forms a receptor for a lightning rod.

Figure 6:
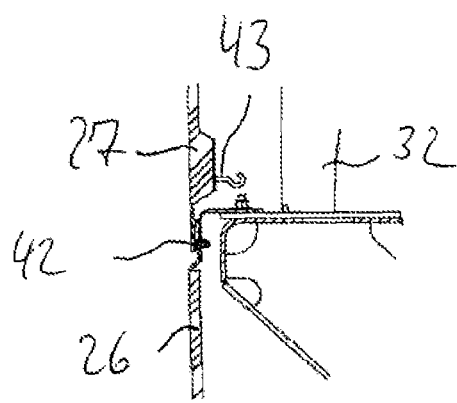
FIG. 6 shows an enlarged illustration of a detail from FIG. 5.
Figure 7:
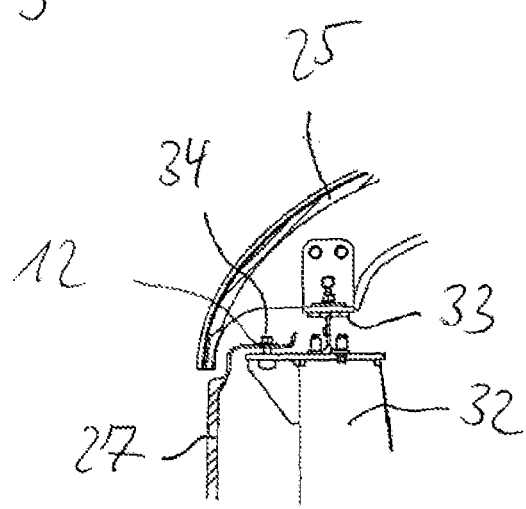
FIG. 7 shows an enlarged illustration of a detail from FIG. 5.

The side panels 27 are connected to the rear portion of the substructure 32 via screw connections 34, which extend through bores 12 adjacent to the fixed bearings 33. The lower end of the side panels 27 is drawn inward, and therefore retained against the rear portion of the substructure 32, by a pull rod 35 connected to an anchoring point 13 of the rear portion of the substructure 32. FIG. 6 shows a hook 43, on which the pull rod is hooked. The lower end of the side panels 27 can be displaced relative to the rear portion of the substructure 32 in the longitudinal direction. There is no screw connection or any other rigid connection, in relation to the rear portion of the substructure 32 at the lower end of the side panels 27. The only rigid connection between the side panels 27 and the rear portion of the substructure 32 is formed by the screws 34.

Figure 12:
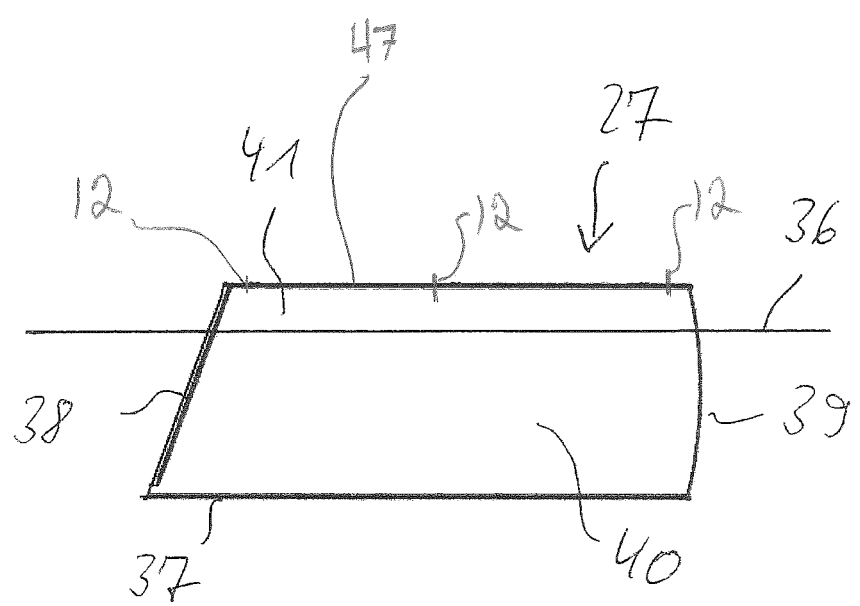
FIG. 12 shows a side panel of an enclosure according to the invention.

FIG. 12 depicts an imaginary straight line which is aligned with a lower edge 37 of the side panel 27 and intersects the two lateral edges 38, 39 of the side panel 27. The region beneath the imaginary straight line 36 is denoted as the first sub-portion 40 of the side panel 27. The region above the imaginary straight line is denoted as the second sub-portion 41 of the side panel 27. In FIG. 12, the first sub-portion 40 makes up considerably more than half the surface area of the side panel 27. In the second sub-portion 41, there is a screw connection 34 between the side panel 27 and the rear portion of the substructure 32. The screw connections 34 extend through bores 12 which extend along an upper edge 47 of the side panel 27. In the first sub-portion 40, the side panel 27 has its lower edge butting against the rear portion of the substructure 32 and is retained in this position by pull rods 35. There are no other connections between the side panel 27 and the rear portion of the substructure 32 in the first sub-portion 40 of the side panel 27.

The floor panel 26 is connected to the rear portion of the substructure 32 via screw connections 42. The floor panel 26 is additionally suspended in the center by a hanger 44. There is a respective overlap between the roof panel 25 and the side panel 27, and between the side panel 27 and the floor panel 26, and it is therefore not possible for any rainwater to penetrate.

An intermediate panel 45 is arranged at the transition between the rear end of the front roof panel 20 and the front end of the rear roof panel 25. The intermediate panel 45 is connected to the rear portion 32 of the substructure and has a lower height than the roof panels 20, 25. The two roof panels 20, 25 overlap with the intermediate panel 45. Water which drips down is directed outward via a rain channel 46.

What is claimed:

1. An enclosure for a nacelle (14) of a wind turbine, in which a panel (22, 27) is connected to a substructure (31, 32), said panel (22, 27) having first and second longitudinal edges (37, 47), lateral edges (38, 39), a straight line (36) extending a length of the panel (22, 27), aligned with the first longitudinal edge (37) of the panel (22, 27) and intersecting with said lateral edges (38, 39), wherein the straight line (36) defines a first sub-portion (40) of the panel (22, 27) and a second sub-portion (41) of the panel (22, 27), said first sub-portion (40) comprising the first longitudinal edge (37) of the panel (22, 27), wherein said second sub-portion (41) is arranged on the other side of the straight line (36), and said second sub-portion (41) is connected to the substructure (31, 32) by at least one fixed bearing, wherein the first sub-portion (40) butts against the substructure (31, 32), wherein the first sub-portion (40) is retained against the substructure (31, 32) by a tension element (35) acting in a direction of tension, and wherein the first sub-portion (40) is configured to be displaced relative to the substructure (31, 32) in any direction parallel to a plane defined by the straight line and an area of abutment between the first sub-portion (40) and the substructure (31, 32).

2. The enclosure of claim 1, wherein the second sub-portion (41) comprises a plurality of bores which extend along the second longitudinal edge (47) of the panel (22, 27) and via which the panel (22, 27) is connected to the substructure (31, 32).

3. The enclosure of claim 1, wherein the tension element (35) extends between the first sub-portion (40) of the panel (22, 27) and an anchoring point of the substructure (31, 32).

4. The enclosure of claim 1, wherein the panel is a first side panel (22, 27) of the enclosure (17).

5. The enclosure of claim 4, wherein the first sub-portion (40) forms the lower portion of the first side panel (22, 27).

6. The enclosure of claim 4, comprising a roof panel (20, 25) adjoining the first side panel (22, 27), wherein the roof panel (20, 25) and the first side panel (22, 27) are connected to one another only via the substructure (31, 32).

7. The enclosure of claim 6, wherein, a rear end of the roof panel (20, 25) is retained by a tension device (29), which exerts tension in a forward direction toward a rotor of the wind turbine.

8. The enclosure of claim 7, wherein the tension device (29) comprises a receptor of a lightning rod.

9. The enclosure of claim 4, wherein a floor panel (26) adjoins the first side panel (22, 27), and wherein the first sub-portion (40) of the first side panel (22, 27) can be displaced relative to the floor panel (26) in a longitudinal direction parallel to a rotor axis of the wind turbine.

10. The enclosure of claim 4, comprising the first side panel (22) and a second side panel (27), which are arranged one behind the other in a longitudinal direction and can be displaced relative to one another in the longitudinal direction parallel to a rotor axis of the wind turbine.

11. The enclosure of claim 10, wherein the first side panel (22) is connected to a first portion (31) of the substructure, and wherein the second side panel (27) is connected to a second portion (32) of the substructure, it being possible for the side panels (22, 27) to be displaced relative to one another, when the substructure (31, 32) is subjected to elastic deformation.

12. The enclosure of claim 1, comprising a first roof panel (20) and a second roof panel (25), wherein the first roof panel (20) is connected to a first portion (31) of the substructure, the second roof panel (25) is connected to a second portion (32) of the substructure, said first portion of the substructure (31) being spaced from the second portion of the substructure (32) in a longitudinal direction parallel to the rotor axis of the wind turbine, and the roof panels (20, 25) can be displaced relative to one another, when the substructure (31, 32) is subjected to elastic deformation.

13. The enclosure of claim 12, comprising an intermediate panel (45) arranged between the first roof panel (20) and the second roof panel (25) and overlaps with the first roof panel (20) and the second roof panel (25) in the longitudinal direction.

14. The enclosure of claim 13, wherein the intermediate panel (45) includes a water channel (46).

15. The enclosure of claim 1, wherein said tension element (35) is a pull rod, a pull cable, or a tension spring.

* * * * *